US011119188B2

(12) United States Patent
Muto (10) Patent No.: US 11,119,188 B2
(45) Date of Patent: Sep. 14, 2021

(54) MALFUNCTION DETECTING DEVICE (71) Applicant: HITACHI AUTOMOTIVE SYSTEMS, LTD., Hitachinaka (JP)

(72) Inventor: Yuta Muto, Ibaraki (JP)

(73) Assignee: HITACHI AUTOMOTIVE SYSTEMS, LTD., Hitachinaka (JP)

(*) Notice: Subject to any disclaimer, the term of this patent is extended or adjusted under 35 U.S.C. 154(b) by 178 days.

(21) Appl. No.: 16/336,159

(22) PCT Filed: Oct. 13, 2017

(86) PCT No.: PCT/JP2017/037121
§ 371 (c)(1),
(2) Date: Mar. 25, 2019

(87) PCT Pub. No.: WO2018/079297
PCT Pub. Date: May 3, 2018

(65) Prior Publication Data
US 2019/0285726 A1 Sep. 19, 2019

(30) Foreign Application Priority Data

Oct. 27, 2016 (JP) .............................. JP2016-211011

(51) Int. Cl.
*G01S 7/40* (2006.01)
*H04W 4/48* (2018.01)
(Continued)

(52) U.S. Cl.
CPC ............... *G01S 7/40* (2013.01); *G01S 13/04* (2013.01); *G01S 13/86* (2013.01); *G01S 13/867* (2013.01);
(Continued)

(58) Field of Classification Search
CPC . G01S 7/40; G01S 13/86; G01S 13/93; G01S 13/04; G01S 13/867; G01S 13/931;
(Continued)

(56) References Cited

U.S. PATENT DOCUMENTS

2005/0062615 A1   3/2005  Braeuchle et al.
2007/0109105 A1*  5/2007  Ohno ..................... G07C 5/008
                                                            340/425.5
(Continued)

FOREIGN PATENT DOCUMENTS

DE   10 2015 206 605 A1   10/2016
EP      2 385 508 A2      11/2011
(Continued)

OTHER PUBLICATIONS

International Search Report with English translation and Written Opinion issued in corresponding application No. PCT/JP2017/037121 dated Dec. 12, 2017.

(Continued)

*Primary Examiner* — Rodney A Butler
(74) *Attorney, Agent, or Firm* — Foley & Lardner LLP (57) ABSTRACT

The present invention provides a malfunction detecting device with which, even if an error exceeding a scope of guarantee occurs in the position or speed of a peripheral object output by a sensor which monitors the periphery of a vehicle, the output from the sensor in which the error exceeding the scope of guarantee has occurred in the position or speed of the peripheral object is detected as abnormal. This malfunction detecting device is characterized in that the malfunction detecting device detects an object using two sensors A, B, and if a difference equal to or greater than a prescribed value arises between state quantities of the detected object, the malfunction detecting device uses standard information relating to the state quantity of the object (Continued)

to determine in which of the two sensors A and B the measurement failure has occurred.

4 Claims, 6 Drawing Sheets

(51) Int. Cl.
| | |
|---|---|
| *G01S 13/04* | (2006.01) |
| *G01S 13/86* | (2006.01) |
| *G01S 13/93* | (2020.01) |
| *G07C 5/00* | (2006.01) |
| *G08G 1/16* | (2006.01) |
| *G01V 8/10* | (2006.01) |
| *G01S 13/931* | (2020.01) |
| *H04W 4/46* | (2018.01) |
| *H04W 4/44* | (2018.01) |

(52) U.S. Cl.
CPC ............ *G01S 13/93* (2013.01); *G01S 13/931* (2013.01); *G01V 8/10* (2013.01); *G07C 5/008* (2013.01); *G08G 1/16* (2013.01); *G08G 1/163* (2013.01); *H04W 4/48* (2018.02); *H04W 4/44* (2018.02); *H04W 4/46* (2018.02)

(58) Field of Classification Search
CPC ........... G01S 13/87; G01S 2013/93272; G01S 2013/93274; G01S 2013/93271; G01S 7/142; G01S 2007/4091; G01S 2013/9316; G08G 1/16; G08G 1/163; G01V 8/10; H04W 4/48; H04W 4/46; H04W 4/44; G07C 5/008
See application file for complete search history.

(56) References Cited

U.S. PATENT DOCUMENTS

| | | | |
|---|---|---|---|
| 2010/0099353 A1 | 4/2010 | Komori | |
| 2016/0187479 A1 | 6/2016 | Shibata et al. | |
| 2016/0288789 A1* | 10/2016 | Durgin | ............ B60W 30/18154 |
| 2017/0046958 A1 | 2/2017 | Naka | |

FOREIGN PATENT DOCUMENTS

| | | |
|---|---|---|
| JP | H11-52054 A | 2/1999 |
| JP | 2000-321350 A | 11/2000 |
| JP | 2005-505074 A | 2/2005 |
| JP | 2007-163258 A | 6/2007 |
| JP | 2008-225786 A | 9/2008 |
| JP | 2009-281862 A | 12/2009 |
| JP | 2015-78925 A | 4/2015 |
| JP | 2015-230665 A | 12/2015 |

OTHER PUBLICATIONS

Office Action issued in corresponding Japanese Patent Application No. 2018-547556 dated Apr. 14, 2020.

Extended European Search Report issued in corresponding European Patent Application No. 17865855.5 dated Feb. 19, 2020.

* cited by examiner

MALFUNCTION DETECTING DEVICE

TECHNICAL FIELD

The present invention relates to a malfunction detecting device that detects an abnormality of a sensor that monitors the periphery of an object such as an automobile.

BACKGROUND ART

There is a technique described in JP 2015-230665 A (PTL 1) in order to provide an obstacle-information-managing device that determines the presence or absence of an obstacle around a vehicle with high accuracy.

The obstacle-information-managing device described in this publication includes: an obstacle information acquiring unit that acquires obstacle information pertaining to an obstacle, which is detected by an external sensor mounted in each of a plurality of vehicles including a host vehicle, at the periphery of the vehicle; an obstacle detection possibility information acquiring unit that acquires obstacle detection possibility information, when at least one obstacle included in the obstacle information is detected with the external sensor that is mounted in at least one vehicle among the plurality of vehicles, and the at least one obstacle is not detected with the external sensor that is mounted in remaining vehicles other than the at least one vehicle among the plurality of vehicles, as to whether or not the at least one obstacle is capable of being detected in principle with the external sensor that is mounted on each of the remaining vehicles; and an obstacle presence determining unit that determines the presence of the at least one obstacle based on the obstacle detection possibility information and the obstacle information.

CITATION LIST

Patent Literature

PTL 1: JP 2015-230665 A

SUMMARY OF INVENTION

Technical Problem

In automatic driving/driving assistance systems, it is necessary to avoid danger such as a collision with another vehicle based on information of a sensor monitoring the periphery of a host vehicle. At that time, it is required to be capable of safely continuing automatic driving/driving assistance even when a position or speed of a peripheral object output by a certain sensor has an error exceeding a scope of guarantee the sensor due to axis-shaking or malfunction of the sensor.

In PTL 1, a case of non-detection in which a certain sensor does not output a position or speed of the peripheral object is assumed, but a case where an error in the position or speed of the peripheral object output by the sensor exceeds a scope of guarantee is not assumed.

Therefore, an object of the present invention is to provide a malfunction detecting device with which, even if an error exceeding a scope of guarantee occurs in the position or speed of a peripheral object output by a sensor which monitors the periphery of a vehicle, the output from the sensor in which the error exceeding the scope of guarantee has occurred in the position or speed of the peripheral object is detected as abnormal.

Solution to Problem

In order to solve the above problem, a malfunction detecting device, which is a representative of the present invention, is characterized in by using standard information relating to a state quantity of a detection target to determine in which of the two sensors "abnormality (measurement failure) has occurred when a difference greater than a prescribed value occurs between measurement values of state quantities obtained by detecting the same detection target by the two sensors different from each other.

Advantageous Effects of Invention

According to the present invention, it is possible to identify the sensor in which the error exceeding the prescribed value has occurred in the position or speed of the peripheral object, and thus, it is possible to safely continue automatic driving/driving assistance even if the error exceeding the prescribed value has occurred in a position or speed of the peripheral object output by a certain sensor. Other objects, configurations, and effects which have not been described above become apparent from embodiments to be described hereinafter.

DESCRIPTION OF EMBODIMENTS

Hereinafter, embodiments will be described with reference to the drawings.

First Embodiment

Figure 1A:
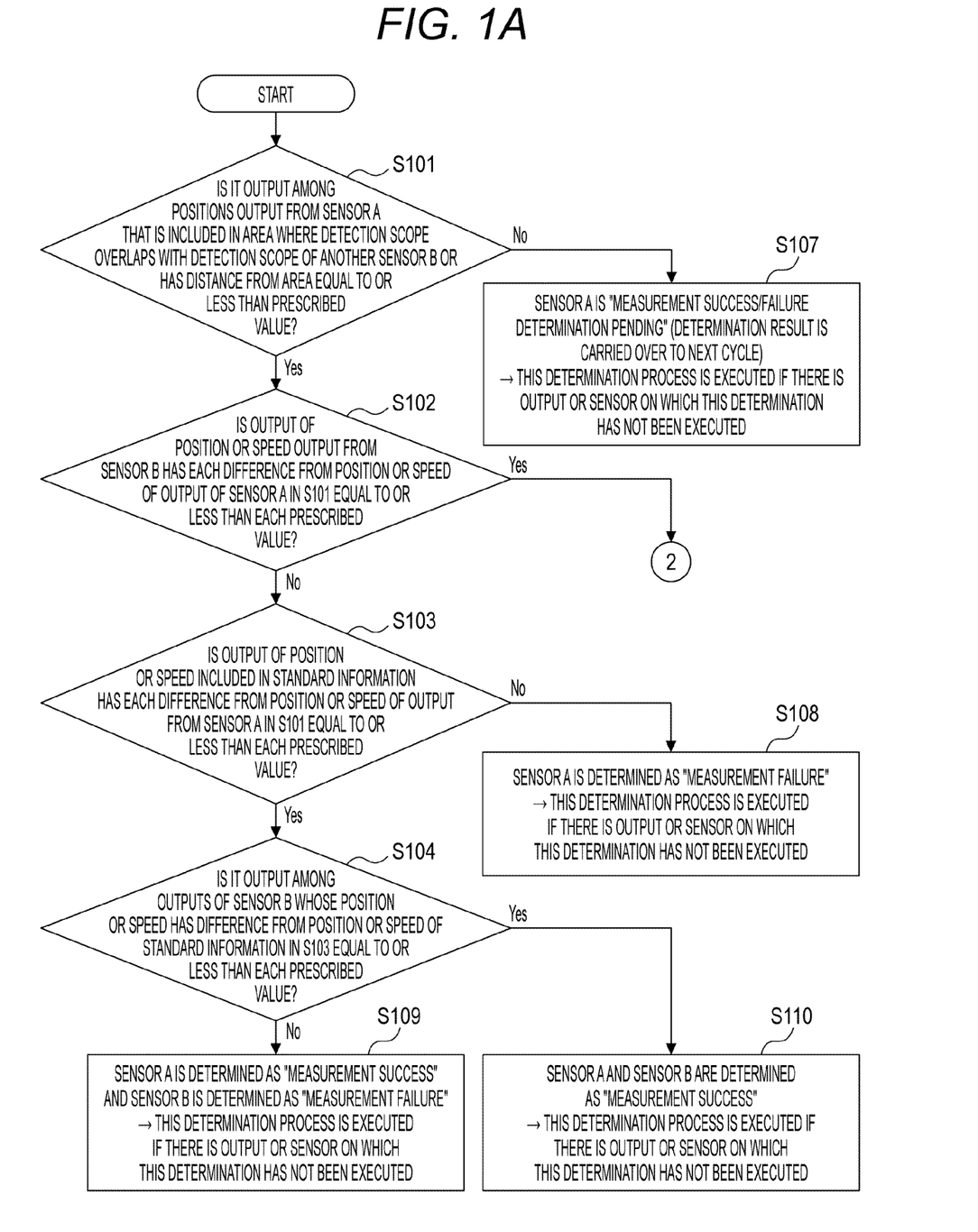
FIG. 1A is a flowchart illustrating an embodiment of a processing procedure for measurement success/failure determination of each sensor of the present invention.
Figure 1B:
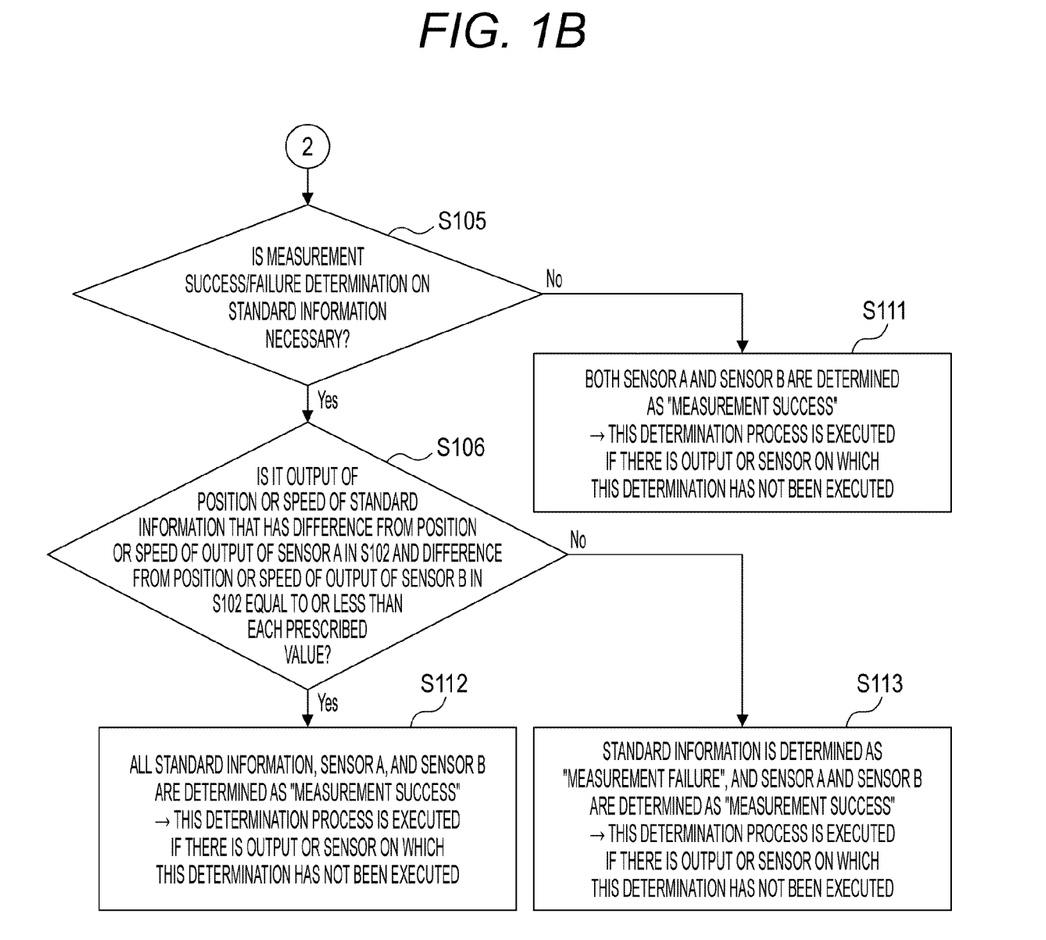
FIG. 1B is a flowchart illustrating the embodiment of the processing procedure for measurement success/failure determination of each sensor of the present invention.
Figure 2:
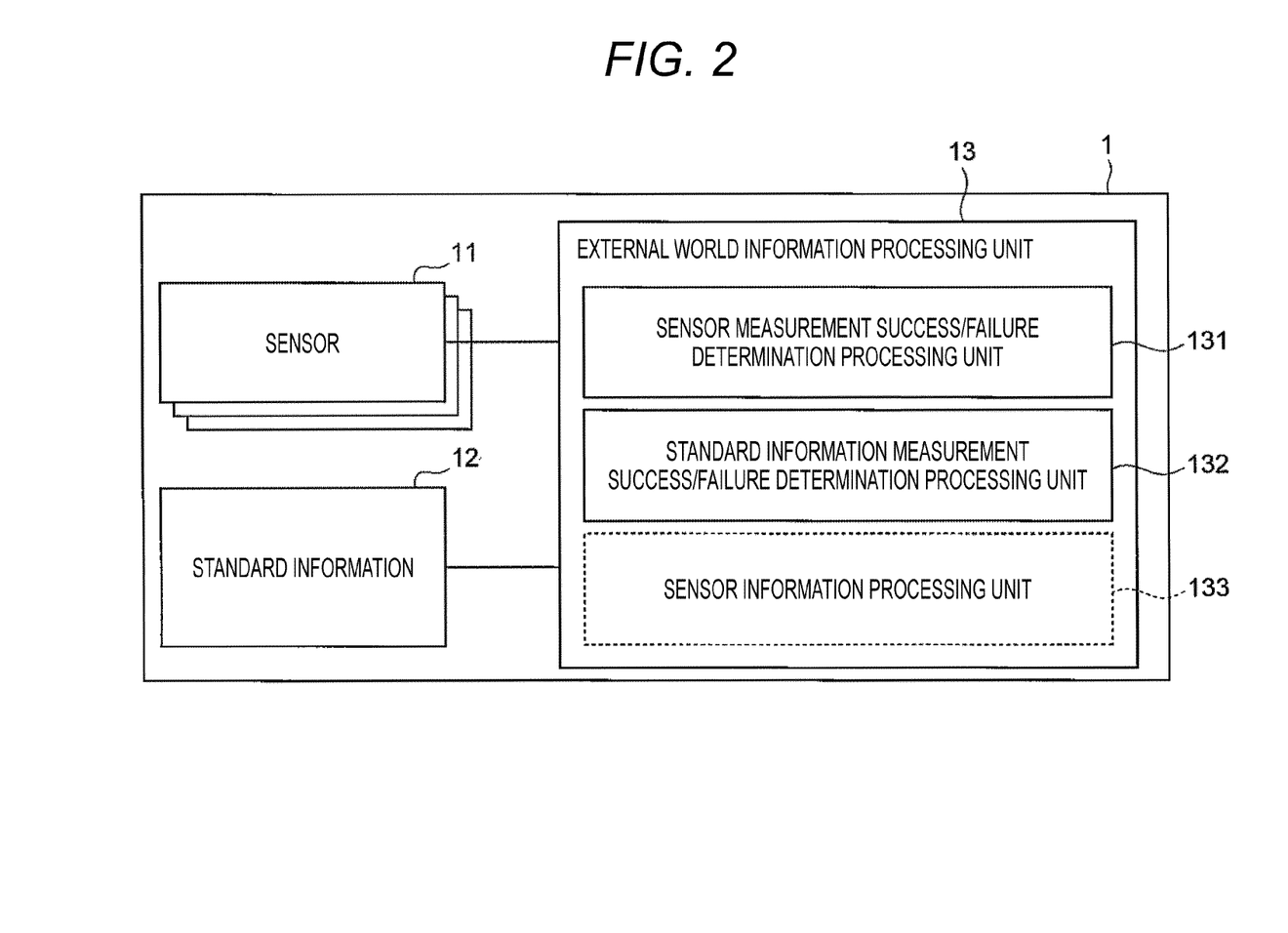
FIG. 2 is a block diagram illustrating a configuration of a malfunction detecting device according to the present invention.
Figure 3:
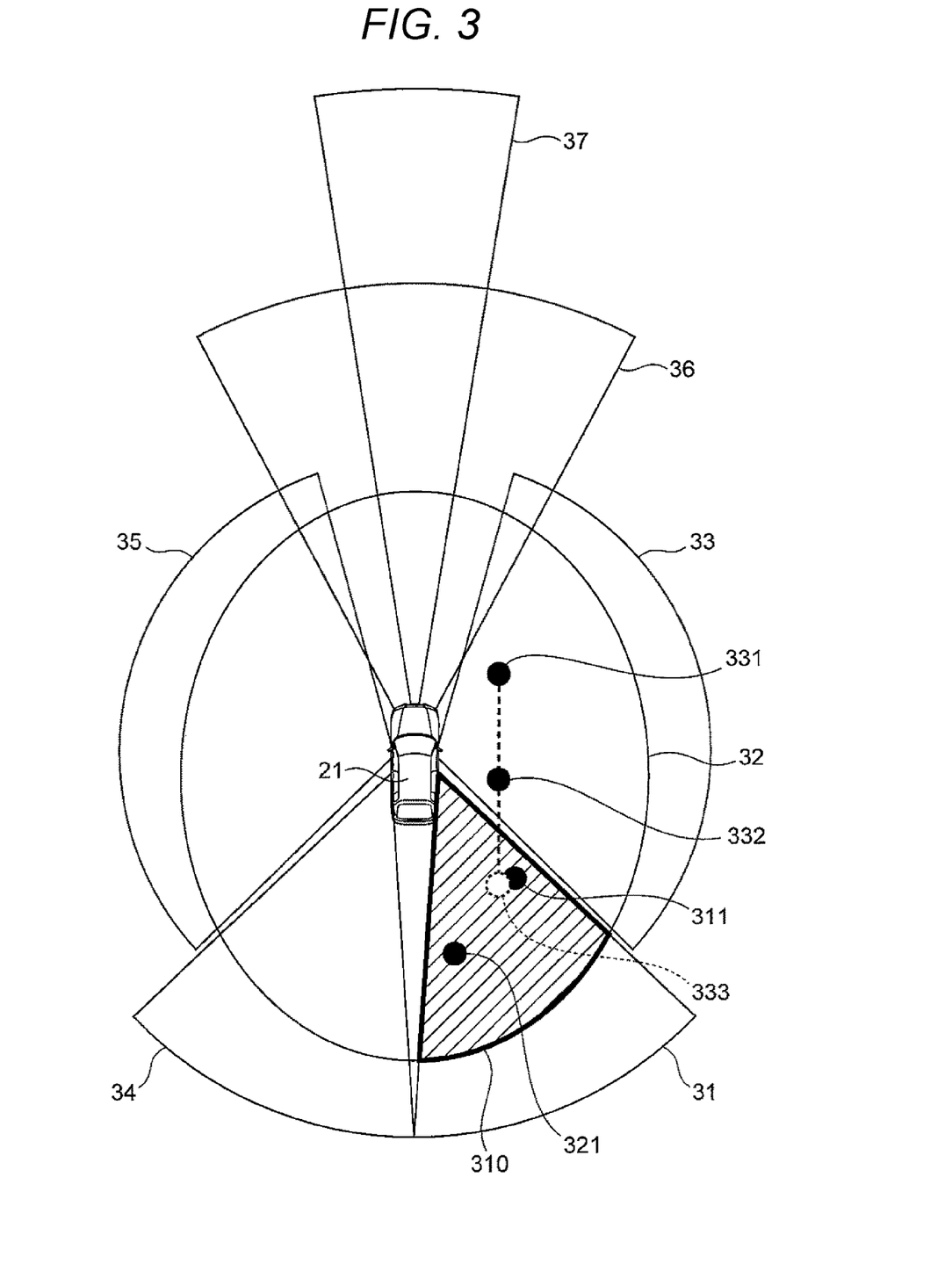
FIG. 3 is an example of a sensor configuration diagram illustrating an embodiment of acquisition of standard information when the present invention according to a first embodiment is applied to an automobile.

FIGS. 1A and 1B are flowcharts illustrating an embodiment of a processing procedure for measurement success/failure determination of each sensor of the present invention; FIG. 2 is a block diagram illustrating a configuration of a malfunction detecting device according to the present invention; and FIG. 3 is an example of a sensor configuration diagram illustrating an embodiment of acquisition of standard information 12 when the present invention according to a first embodiment is applied to an automobile.

A malfunction detecting device 1 is installed in a host vehicle and detects malfunction of a sensor. The malfunction detecting device 1 includes: a plurality of sensors 11 such as cameras and radars detecting a position or speed of a peripheral object; and an external information processing unit 13 acquiring information on a position or speed of the peripheral object from the standard information 12 including the position or speed of the peripheral object.

The plurality of sensors 11 is attached to the host vehicle and detects state quantities of peripheral objects existing around the host vehicle. The state quantity of the peripheral object includes at least one of information such as a position of the peripheral object, a separation distance from the host vehicle, and speed or the acceleration. In the present embodiment, a sensor A having a detection scope 31 on the right rear side of a host vehicle 21, a sensor B having an elliptical detection scope 32 centered on the host vehicle 21, a sensor C having a detection scope 33 on the right side of the host vehicle 21, a sensor D having a detection scope 34 on the left rear side of the host vehicle 21, a sensor E having a detection scope 35 on the left side of the host vehicle 21, a sensor F having a detection scope 36 of a relatively wide angle and a short distance on the front side of the host vehicle 21, and a sensor G having a detection scope 37 of a relatively narrow angle and a long distance on the front side of the host vehicle 21 are provided as illustrated in FIG. 3.

The external information processing unit 13 performs a process of acquiring the standard information 12 including the information of the plurality of sensors 11 and the state quantity of the peripheral object and determining whether a measurement by a sensor has succeeded and whether the standard information is favorable. The external information processing unit 13 includes a sensor measurement success/failure determination processing unit 131 that determines measurement success/failure of the plurality of sensors 11, and a standard information measurement success/failure determination processing unit 132 that determines measurement success/failure of the standard information 12. In addition, the external information processing unit 13 may have a sensor information processing unit 133 that acquires information of the sensor 11 and performs processing such as conventional sensor fusion. In the case of providing the sensor information processing unit 133, a part of hardware and software related to information acquisition of the sensor 11 of the conventional sensor information processing unit 133 can be shared with the malfunction detecting device 1, and thus, a cost reduction effect is expected.

The external information processing unit 13 compares state quantities detected by two sensors that detect the same peripheral object from among the plurality of sensors 11 to determine whether there is a difference greater than a prescribed value between the state quantities. Then, when there is no difference greater than the prescribed value, that is, when the difference is equal to or less than the prescribed value, both the two sensors are normal and determined as the measurement success.

On the other hand, if there is the difference greater than the prescribed value between the state quantities, each of the state quantities detected by the two sensors is compared with the standard information to determine whether there is a difference greater than a prescribed value between the state quantity and the standard information. The standard information includes a state quantity obtained when the same peripheral object detected by the two sensors is detected by a sensor (third sensor) 11 different from the two sensors, or information on a state quantity obtained by vehicle-to-vehicle communication with another vehicle or road-to-vehicle communication with a traffic infrastructure, and has a predetermined scope. Here, the presence or absence of an abnormality is determined using the two sensors as one set, and, it is determined which one of the two sensors is abnormal with the measurement failure when there is the abnormality. Therefore, it is possible to identify an abnormal sensor in which an error exceeding a prescribed value occurs in the state quantity of the peripheral object.

Then, when it is determined that the outputs of the two sensors are normal, it is determined whether the standard information of the peripheral object is normal. Whether the standard information of the peripheral object is normal is determined by comparing the standard information with the state quantities detected by the two sensors. It is determined that the standard information is abnormal when a difference between the standard information and each of the state quantities detected by the two sensors is greater than a prescribed value, and it is determined that the standard information is normal when the difference is within the prescribed value. An execution trigger of the determination on whether the standard information is normal is arbitrary. For example, the determination on whether the standard information is normal may be performed every time malfunction determination of two sensors is performed, or may be performed at a preset timing such as at an initial start of an engine in a day, at a start of movement from a vehicle stop state, and every prescribed time.

Operations based on the flowcharts in FIGS. 1A and 1B are as follows. Incidentally, the operation of the flowchart is executed, for example, at a prescribed cycle determined in advance, and only information output from a previous processing cycle to a current processing cycle or the latest output information is used as the following outputs of the sensor and the standard information. In addition, this process is repeatedly executed for each sensor until measurement success/failure determination results are obtained for all prescribed sensors to be subjected to the measurement/failure determination.

Sensor Measurement Success/Failure Determination Process

Step S101: Determination on Presence or Absence of Determination Target (Determination on Presence or Absence of a Sensor Output in the Vicinity of a Duplex Scope)

It is determined whether a position of a peripheral object output by a certain sensor (hereinafter referred to as a sensor A) included in the plurality of sensors 11 is included in an area where a detection scope overlaps with detection scope of another sensor (hereinafter referred to as a sensor B) (an area 310 indicated by hatching where a detection scope 31 (right rear sector) of the sensor A and a detection scope (central ellipse) 32 of the sensor B) overlap with each other in the case of a sensor configuration illustrated in FIG. 3) or whether a separation distance between the position of the peripheral object and the overlapping area 310 is equal to or less than a prescribed value. The process proceeds to step S102 in order to perform determination on measurement success or measurement failure of the sensor A and the sensor B in the case of YES, or proceeds to step S107 to set a result of measurement success/failure determination of the sensor A to "pending" (the determination result is carried over to the next cycle) in the case of NO.

Step S102: Standard Information Necessity Determination

It is determined whether an output of the position 321 or speed of the peripheral object output by the sensor B has each difference from a position 331 or speed output by the sensor A satisfying the condition of step S101 equal to or less than each prescribed value. That is, it is determined whether the difference between the outputs of the sensors A and B is within the prescribed value.

Then, the process proceeds to standard information measurement success/failure determination process (step S105), which will be described later, in the case of YES, or proceeds to step S103 in the case of NO. Incidentally, the information (state quantity) to be determined in the subsequent processing may be either one of the position or speed of the peripheral object, or both the position and speed.

In S102, the same peripheral object is detected by the sensor A and the sensor B, and a state quantity detected by the sensor A is compared with a state quantity detected by the sensor B to determine whether there is a difference greater than a prescribed value between the state quantities. Then, if the difference is greater than the prescribed value, the process proceeds to step S103 and subsequent steps. In addition, if the difference is within the prescribed value, both it is determined that the sensor A and the sensor B are normal, and the reference value information is unnecessary. Then, the process proceeds to step S105 and subsequent steps in FIG. 1B in order to determine whether the success/failure of the standard information.

Step S103: Sensor A Output Determination

It is determined whether an output of the position or speed included in the standard information 12 has each difference from the position or speed of the output of the sensor A satisfying the condition of step S101 equal to or less than each prescribed value. That is, it is determined whether the difference between the output of the sensor A and the standard information is within the prescribed value. Then, the process proceeds to step S104 in the case of YES, or the measurement success/failure determination result of the sensor A is set to "failure" in the case of NO. Here, the result determined as "failure" may be notified to the sensor information processing unit 133, for example, such that the measurement result of the sensor A is not used in the processing such as sensor fusion performed by the sensor information processing unit 133. Incidentally, a method of acquiring the standard information 12 according to the first embodiment will be described later.

In step S103, the state quantity detected by the sensor A is compared with the standard information, the process proceeds to step S108 when the difference therebetween is greater than the prescribed value (NO in S103), and it is determined that the sensor A is abnormal with the measurement failure. On the other hand, when the difference between the state quantity detected by the sensor A and the standard information is within the prescribed value (YES in S103), the process proceeds to step S104 and subsequent steps in order to determine whether the sensor B is abnormal next. For example, when the state quantity of the sensor A has position and speed information in the comparison between the state quantity of the sensor A and the standard information, the position and speed information of the sensor A are compared with position and speed information included in the standard information, respectively. Then, when at least one of a difference in position and a difference in speed is greater than the prescribed value, the process proceeds to step S108, and it is determined that the sensor A is abnormal with the measurement failure.

Step S104: Sensor B Output Determination

It is determined whether an output of the position or speed output by the sensor B has each difference from the position or speed of the output of the standard information 12 satisfying the condition in step S103 equal to or less than each prescribed value. The process proceeds to step S109 to set a result of measurement success/failure determination of the sensor A to "success" and a result of measurement success/failure determination of the sensor B to "failure" in the case of NO. In the case of YES, each of the measurement success/failure determination result of the sensor A and the measurement success/failure determination result of the sensor B is set to "success".

The above-described processing (steps S101 to S104) is executed by the sensor measurement success/failure determination processing unit 131, and the following processing (steps S105 to S106) is executed by the standard information measurement success/failure determination processing unit 132.

In step S104, the state quantity detected by the sensor B is compared with the standard information, the process proceeds to step S110 when a difference therebetween is within a prescribed value (YES in S104), and it is determined that both the sensor A and the sensor B are normal with the measurement success. On the other hand, when the difference between the state quantity detected by the sensor B and the standard information is greater than the prescribed value (NO in S104), the process proceeds to step S109, and the sensor A is determined as the measurement success, and the sensor B is determined as the measurement failure. For example, when the state quantity of the sensor B has position and speed information in the comparison between the state quantity of the sensor B and the standard information, the position and speed information of the sensor B are compared with position and speed information included in the standard information, respectively. Then, when at least one of a difference in position and a difference in speed is greater than the prescribed value, the process proceeds to step S109, and it is determined that the sensor B is abnormal with the measurement failure.

Measurement Success/Failure Determination Processing of Standard Information

Step S105:

It is determined whether measurement success/failure determination of the position or speed included in the standard information 12 is necessary. As a determination criterion, for example, a time when previous measurement success/failure determination of the position or speed included in the standard information 12 was performed is stored, and it is determined as YES only when a difference between the above time and a current time is greater than a prescribed processing cycle time. An execution trigger of step S105 is arbitrary. For example, processing may be executed when a prescribed time or longer has passed since the previous determination.

The process proceeds to step S106 when a result of this determination is YES. In the case of NO, the standard information 12 is not used, and the measurement success/failure determination result of the sensor A and the measurement success/failure determination result of the sensor B are set to "success". With this determination, it is possible to obtain the measurement success/failure determination result of the sensor A and the measurement success/failure determination result of the sensor B without constantly acquiring the standard information 12. Thus, the processing amount of a CPU and the capacity of a memory can be reduced, and an effect of further reducing cost is expected as compared with a method of constantly acquiring the standard information 12.

Step S106:

It is determined whether an output of the position or speed included in the standard information 12 has each difference from the position or speed of each of the output of the sensor A satisfying the condition of step S102 and the output of the sensor B satisfying the condition of step S102 equal to or less than each prescribed value. Here, for example, it is determined whether both the difference from the position or speed of the output of the sensor A in step S102 and the difference from the position or speed of the output from the sensor B in step S102 of the standard information of the position or speed are equal to or less than the respective prescribed values. Then, the measurement success/failure determination result of the standard information 12, the measurement success/failure determination result of the sensor A, and the measurement success/failure determination result by the sensor B are set to "success" in the case of YES, or the measurement success/failure determination result of the standard information 12 is set to "failure", and the success/failure determination result of the sensor A and the measurement success/failure determination result of the sensor B are set to "success" in the case of NO. As a result, the accuracy of the standard information 12 is confirmed based on whether the state quantities of the peripheral object detected by the two sensors A and B are within a prescribed allowable error scope.

Since the accuracy of the standard information 12 can be confirmed with this determination, the accuracy of the measurement success/failure determination results of the sensors performed based on the standard information in steps S101 to S104 can be maintained. Here, when the standard information 12 is determined as "failure", the sensor measurement success/failure determination processing unit 131, for example, may be notified of the result such that the processing of step S103 and the subsequent steps of the sensor measurement success/failure determination process performed by the sensor measurement success/failure determination processing unit 131 is not be executed until the standard information 12 is determined again as "success".

Incidentally, the sensor measurement success/failure determination processing unit 131 may automatically correct an output of a sensor for the sensor determined as "failure" in the sensor measurement success/failure determination process. For example, the sensor measurement success/failure determination processing unit 131 may execute sensor measurement success/failure determination processes of the next and subsequent cycles by adding a relative difference in position or speed from the position or speed included in the standard information 12 when the position or the speed output from the sensor determined as "failure" calculated in the above sensor measurement success/failure determination process is used as a reference, as an offset amount, to the position or speed output from the sensor determined as "failure" calculated in the above sensor measurement success/failure determination process.

With the above automatic correction, automatic driving/driving assistance can be safely continued only with the outputs of sensor A and sensor B without using the standard information 12 depending on a factor for the determination of "failure" of the sensor in the sensor determined as "failure" in the above sensor measurement success/failure determination. Thus, the processing amount of the CPU and the capacity of the memory can be reduced, and the effect of reducing the cost is expected as compared with a method of not performing the automatic correction.

Example of Method of Acquiring Standard Information

The standard information 12 according to the first embodiment, used for measurement success/failure determination in the detection scope overlapping area 310 between the sensor A and the sensor B, can be acquired by estimation based on a past value of a position or speed output from a third sensor (hereinafter referred to as a sensor C) different from the sensors A and B. A timing to acquire the standard information 12 may be set to each time when a peripheral object is detected by the sensors A and B, or may be acquired when it is determined in step S102 that the difference between the state quantity of the sensor A and the state quantity of the sensor B is greater than the prescribed value, that is, when detecting an abnormality in the sensors A and B.

For example, a result, obtained by an average acceleration is calculated based on a difference between speed output by the sensor C at a previous output cycle (time T2) and speed output at an output cycle (time T1) immediately before the previous output cycle and calculating a position or speed of a current output cycle (time T3) from the position or speed of the previous output cycle (time T2) assuming that the average acceleration from the previous output cycle (time T2) to the current output cycle (time T3) is invariant, may be used as the standard information 12.

In the example illustrated in FIG. 3, a position 333 of a certain peripheral object at the current cycle (time T3) is calculated based on a difference between a position 332 detected by the sensor C at the previous cycle (time T2) and a position 331 detected by the sensor C at the cycle (time T1) immediately before the previous cycle, and the position 333 is used as the standard information 12.

In the current cycle (time T3), the peripheral object detected by the sensor C is detected by the sensor A and the sensor B, and the position 311 of the peripheral object detected by the sensor A is compared with the position 321 of the peripheral object detected by the sensor B. As illustrated in FIG. 3, both the positions are separated from each other by more than the prescribed value, and thus, each of the positions is compared with the position 333 of the standard information 12 this time. Since the position 311 output by the sensor A substantially coincides with the position 333 of the standard information 12, it is determined that the sensor A is normal with the measurement success. On the other hand, the position 321 output by the sensor B is far away from the position 333 of the standard information 12 by more than the prescribed value, and the sensor B is determined as the measurement failure.

When using the method of acquiring the standard information 12 according to the first embodiment, it is possible to acquire the standard information 12 only with sensors capable of detecting the vicinity of the detection scope overlapping area which is the target of the sensor measurement success/failure determination, and thus, the effect of reducing the cost related to the acquisition of the standard information is expected as compared with a constantly triplex sensor configuration.

Incidentally, the case where the sensors 11 to be subjected to the malfunction detection are the sensors A and B has been described in the above-described first embodiment, but this determination may be executed on the remaining sensors of the sensors 11, for example, the sensor B and the sensor C, the sensor B and a sensor D, and the like. If there is a sensor that has not yet been subjected to the determination, this determination processing is executed.

In addition, the description has been given in the first embodiment by exemplifying the case where the measurement failure of the sensor A or B is determined depending on whether there is the difference greater than the prescribed value between the state quantity of the peripheral object detected by the sensor A or B and the standard information, but the determination criterion is not limited to the difference. For example, the determination may be performed based on a ratio between the state quantity of the peripheral object detected by the sensor A or B and the standard information, and it may be determined as measurement failure when the state quantity of the peripheral object detected by the sensor A or B is 0.5 times or less or 1.5 times or more the standard information.

Second Embodiment

In the present embodiment, an acquisition method using communication with the outside is adopted a method of acquiring the standard information 12.

Figure 4:
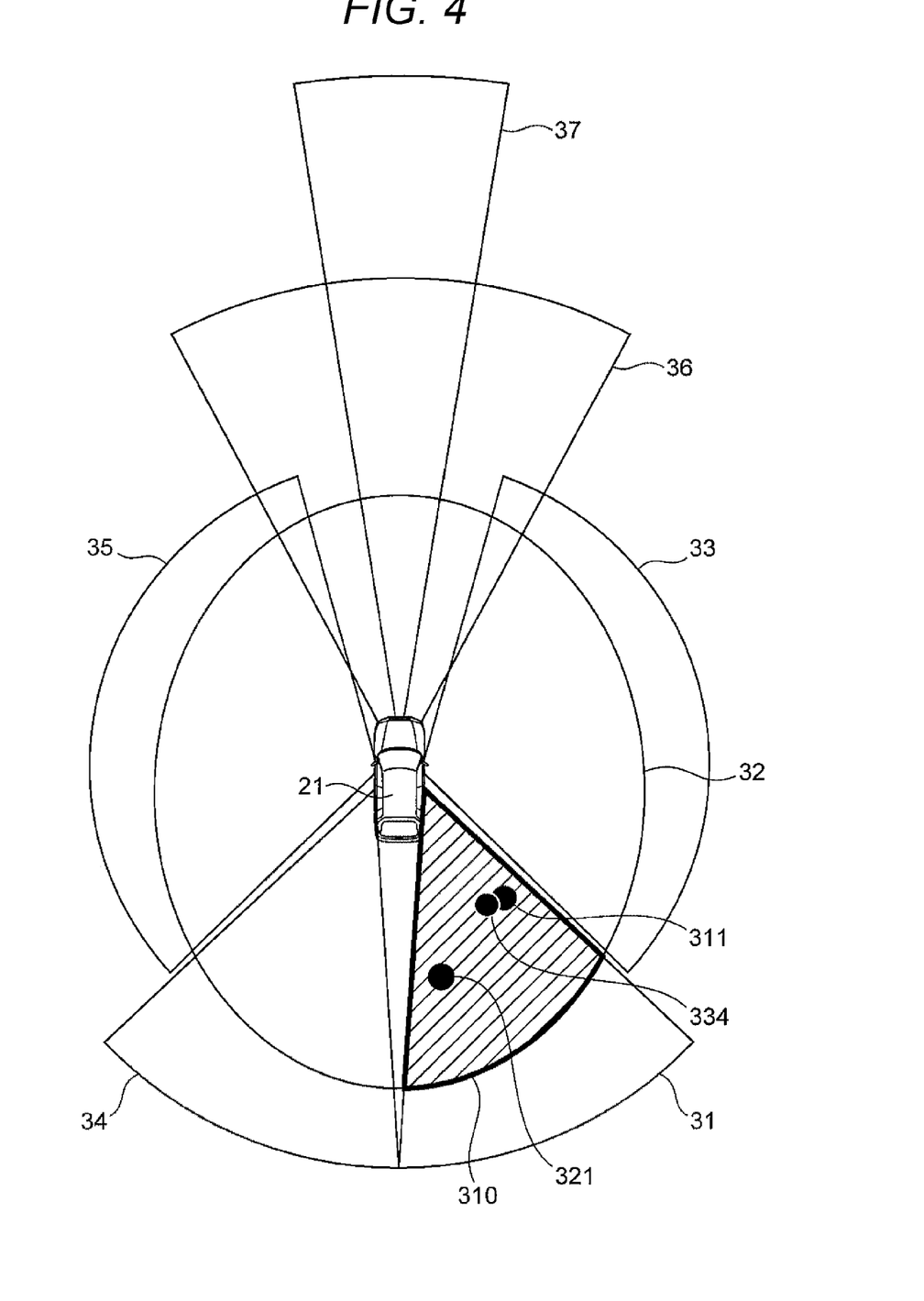
FIG. 4 is an example of a sensor configuration diagram illustrating an embodiment of acquisition of standard information when the present invention according to a second embodiment is applied to an automobile.

FIG. 4 is an example of a sensor configuration diagram illustrating an embodiment of acquisition of the standard information 12 when the present invention according to a second embodiment is applied to an automobile. Incidentally, constituent elements which are the same as those of the first embodiment will be denoted by the same reference signs, and detailed descriptions thereof will be omitted.

The standard information 12 according to the second embodiment, which is used for measurement success/failure determination in the overlapping area 310 between the detection scope 31 of the sensor A and the detection scope 32 of the sensor B, is acquired by communication with the outside.

For example, a result, obtained by calculating a position or speed of a peripheral object based on an image of a surveillance camera installed as a traffic infrastructure (information from road-to-vehicle communication) or information such as the latitude and longitude of a vehicle included in vehicle-to-vehicle communication, may be used as the standard information 12.

In the example illustrated in FIG. 4, a position 334 of the peripheral object acquired by the road-to-vehicle communication is used as the standard information 12. Since the position 311 detected by the sensor A substantially coincides with the position 334 of the standard information 12, it is determined that the sensor A is normal with the measurement success. On the other hand, the position 321 output by the sensor B is far away from the position 334 of the standard information 12 by more than the prescribed value, and the sensor B is determined as the measurement failure.

When using the method of acquiring the standard information 12 according to the second embodiment, it is possible to acquire the standard information 12 only with the communication function, and thus, an effect of reducing cost related to the acquisition of the standard information is expected as compared with a constantly triplex sensor configuration. Further, it is possible to acquire the standard information 12 even if there is no peripheral object moving from the detection scope 33 of the sensor C to the overlapping area 310 between the detection scope 31 of the sensor A and the detection scope 32 of the sensor B, which is different from the first embodiment. Thus, it is possible to expect an effect that the time or throughput required for acquisition of the standard information 12 can be reduced as compared with the first embodiment.

Third Embodiment

In the present embodiment, a method of acquiring the standard information 12 is set to an acquisition method using a sensor whose detection scope is variable.

Figure 5:
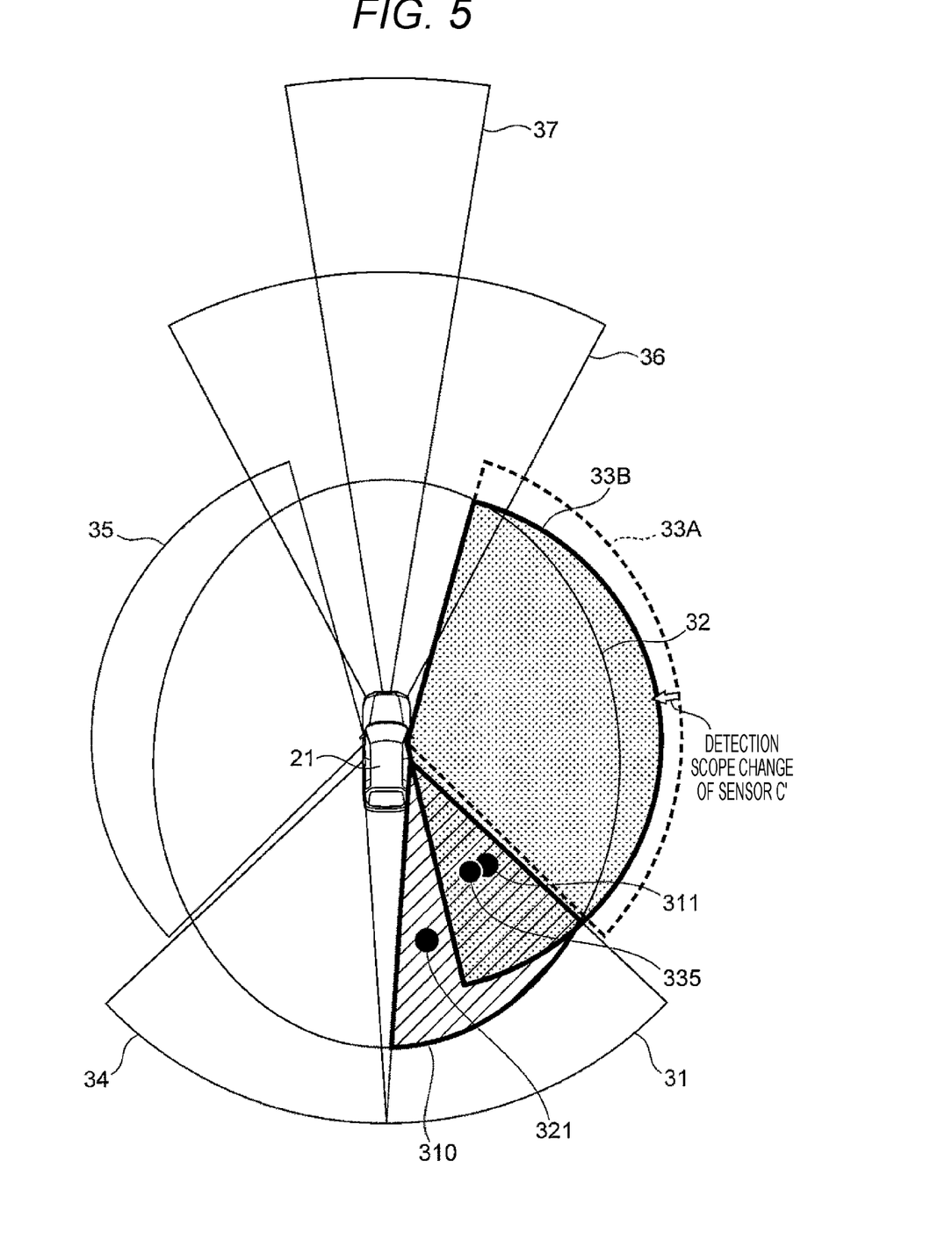
FIG. 5 is an example of a sensor configuration diagram illustrating an embodiment of acquisition of standard information when the present invention according to a third embodiment is applied to an automobile.

FIG. 5 is an example of a sensor configuration diagram illustrating an embodiment of acquisition of the standard information 12 when the present invention according to a third embodiment is applied to an automobile. Incidentally, constituent elements which are the same as those of the first embodiment will be denoted by the same reference signs, and detailed descriptions thereof will be omitted.

The standard information 12 according to the third embodiment, which is used for measurement success/failure determination in the overlapping area 310 between the detection scope 31 of the sensor A and the detection scope 32 of the sensor B, is acquired by a sensor (hereinafter referred to as sensor C') whose detection scope is variable. The sensor C' can change the detection scope from a normal detection scope 33A to a detection scope 33B for sensor determination.

For example, a position or speed, acquired by changing a beam irradiation direction such that the overlapping area 310 between the detection scope 31 of the sensor A and the detection scope 32 of the sensor B can be detected using a millimeter wave radar whose beam irradiation direction is changed by voltage control as the sensor C', may be used as the standard information 12.

In the example illustrated in FIG. 5, a position 335 of a peripheral object detected by changing the detection scope of the sensor C' from the normal detection scope 33A to the detection scope 335 for sensor determination is used as the standard information when compared with an output of the sensor A or an output of the sensor B. The detection scope 33B for sensor determination has a size at least partially overlapping with the overlapping area 310. Since the position 311 detected by the sensor A substantially coincides with the position 335 of the standard information 12, it is determined that the sensor A is normal with the measurement success. On the other hand, the position 321 output by the sensor B is far away from the position 335 of the standard information 12 by more than the prescribed value, and the sensor B is determined as the measurement failure.

When using the method of acquiring the standard information 12 according to the third embodiment, it is possible to acquire the standard information 12 only with the sensor with the variable detection scope that is capable of detecting the detection scope overlapping area which is the target of the sensor measurement success/failure determination, and thus, the effect of reducing the cost related to the acquisition of the standard information is expected as compared with a constantly triplex sensor configuration. Further, it is possible to acquire the standard information 12 even if there is no peripheral object moving from the detection scope 33A of the sensor C' to the overlapping area 310 between the detection scope 31 of the sensor A and the detection scope 32 of the sensor B, which is different from the first embodiment. Thus, it is possible to expect an effect that the time or throughput required for acquisition of the standard information 12 can be reduced as compared with the first embodiment. Furthermore, the standard information 12 can be acquired even in a place with poor communication environment, for example, a tunnel, which is different from the second embodiment. Thus, it is possible to expect the effect that the time or throughput required for acquisition of the standard information 12 can be reduced as compared with the second embodiment.

As above, the embodiments of the present invention have been described in detail, but the present invention is not limited to the above-described embodiments, and various design modifications can be made without departing from the spirit of the present invention recited in the claims. For example, the above-described embodiments have been described in detail in order to describe the present invention in an easily understandable manner, and are not necessarily limited to one including the entire configuration that has been described above. In addition, configurations of another embodiment can be substituted for some configurations of a certain embodiment, and further, a configuration of another embodiment can be added to a configuration of a certain embodiment. Further, addition, deletion, or substitution of other configurations can be made with respect to some configurations of each embodiment.

REFERENCE SIGNS LIST

1 malfunction detecting device
11 sensor
12 standard information
13 external information processing unit
131 sensor measurement success/failure determination processing unit
132 standard information measurement success/failure determination processing unit
133 sensor information processing unit

The invention claimed is:

1. A malfunction detecting device comprising:
two sensors configured to detect an object;
an information processor configured to, when a difference greater than a prescribed value arises between a plurality of state quantities of the detected object, determine in which of two sensors measurements from the two respective sensors a failure has occurred based on standard information relating to a state quantity of the detected object among the plurality of state quantities,
the information processor configured to determine whether a measurement failure has occurred based on the standard information independently of determining in which of the two sensors the measurement failure has occurred; and
a third sensor configured to detect the object, the third sensor being different from the two sensors, the information processor configured to estimate a state quantity of the object based on the state quantity of the detected object detected by the third sensor to use the estimated state quantity as the standard information,
wherein the two sensors are arranged to detect a state quantity of the object in detection scopes of the two sensors while changing a detection scope of the third sensor to acquire the detected state quantity as the standard information.

2. The malfunction detecting device according to claim 1, wherein the information processor is configured to acquire a state quantity of the object, the state quantity being obtained by vehicle-to-vehicle communication with another vehicle or road-to-vehicle communication with a traffic infrastructure, to use the acquired state quantity as the standard information.

3. The malfunction detecting device according to claim 1, wherein the information processor is configured to confirm accuracy of the standard information based on whether the state quantities of the object detected by the two sensors are within a prescribed allowable error scope.

4. The malfunction detecting device according to claim 1, wherein the information processor is configured to correct an output of a sensor, that has been determined to have a measurement failure occur, based on the difference greater than the prescribed value.

* * * * *